United States Patent [19]

Mutti

[11] 4,410,780

[45] Oct. 18, 1983

[54] MACHINES FOR WELDING RAILS OR SIMILAR ARTICLES

[75] Inventor: Marcel A. Mutti, Neuilly sur Seine, France

[73] Assignee: Matix Industries, Paris, France

[21] Appl. No.: 252,264

[22] Filed: Apr. 8, 1981

[30] Foreign Application Priority Data

Apr. 11, 1980 [FR] France ................................. 80 08163

[51] Int. Cl.³ .............................................. B23K 9/225
[52] U.S. Cl. ..................................... 219/53; 29/33 A; 219/78.15; 219/101
[58] Field of Search ...................... 219/53, 78.15, 101, 219/156; 29/33 A

[56] References Cited

U.S. PATENT DOCUMENTS 3,595,463  7/1971  Fadeen ............................. 219/101 X

*Primary Examiner*—Elliot A. Goldberg
*Attorney, Agent, or Firm*—Darby & Darby

[57] ABSTRACT

A machine for flash welding rails having two gripping clamps with conductive jaws pivoted on a common shaft, at least one clamp being able to slide along said shaft relative to the second clamp under the action of a jack and being guided along rods disposed laterally to the rail, which rods also serving as jack rods in which the machine has flash removing cutters mounted on a flash removing clamp independently of the gripping clamp, which flash removing clamp has two clamp halves pivotally and slidably mounted on the same shaft and on the same rods as the gripping clamps.

7 Claims, 5 Drawing Figures

MACHINES FOR WELDING RAILS OR SIMILAR ARTICLES

The present invention relates to machines for welding rails, of the type described in USSR Pat. No. 129,758. Other patents that are relative to this art are, for example, U.S. Pat. Nos. 671,084; 1,433,600; 2,212,393; 2,761,952, German Pat. Nos. 75 07 56; 91 47 65, French Pat. Nos. 749,361; 1,338,095; 1,382,435; 1,384,943; 1,390,443, and Swiss Pat. No. 249,172.

As can be seen from this prior art, the said machines can be used not only for welding rails but, generally, for butt welding any profiles. Thus, in the present specification, the term welding of rails should be understood to be relative to the welding of any profiles of this kind.

When welding railroad rails by means of flash welding machines of this type it is necessary to remove the beads of metal that result from the forge welding. This removal of flash must be effected over the entire periphery of the rail so as not to have changes in the spacing of sleepers or create nonuniformity in the geometry of the rail.

Preferably, for reasons of economy and metallurgical safety, this operation is generally carried out while the work is still hot.

One solution to the above problem was presented by the Paton Institute of Kiev (USSR) (French Patent Application No. 75 15829 of May 21, 1975, No. of publication 2 273 117) and consists of four cutters conforming to the form of profile of the rail.

One lateral cutter and one upper cutter half corresponding to half the profile of the rail along its plane of symmetry are joined to each gripping clamp half of one of the bodies of the machine. Closing of the gripping clamps will cause closing of the bead or flash cutters which are integral with the former, application of the lateral cutters on the rail profile being effected by means of a lever joining these two cutters to their upper section. Upon completion of the weld, the two clamp halves carrying both the conductive jaws and the cutters are slightly loosened and brought closely against the opposite two clamp halves that are disposed stationary on the rail, as a result of which the welding bead will be made smooth and flush with the surrounding metal.

The system described above has a major drawback, since the cutters which are already disposed slightly recessed in respect of the conductive jaws forming the electrodes, and thus also in respect of the rail, move away still more from the profile, viz. mainly at their lower section, when the conductive jaws are loosened, and this will result in inaccurate bead removal.

Another major drawback consists of the fact that one of the two rails adjacent to the welding joint must be loosened immediately after the end of the welding cycle, at a time when the metal is still relatively plastic. As a consequence, the stresses that are transmitted to the rails during application of the clamps by reason of unavoidable geometrical defects of the said rails are applied to the weld, thus causing deformations of the joint and dangers of shear of the metal in the course of solidification.

The object of the present invention is to remedy the drawbacks indicated above.

The invention provides for a machine for flash welding rails of the type comprising two gripping clamps with conductive jaws articulated on the same shaft, at least one clamp being able to slide along said shaft relative to the second clamp under the action of a hydraulic jack or similar device, and being guided along rods disposed laterally to the rail, said rods also being able to be used as hydraulic jack rods. The machine includes flash removing cutters mounted on a clamp independently of the gripping clamp, the two clamp halves of the former being articulated and sliding on the same shaft and on the same rods as the gripping clamp.

In accordance with the preferred embodiment of the invention, each cutter-holding clamp half has the form of a U-shaped frame, surrounding the corresponding gripping clamp half, and sliding by the ends of its arms on the common shaft of articulation. The cutter carried by a clamp half includes at least one portion integral with the said clamp half that reproduces the profile on half the cross section of the rail along its axis of symmetry with the exception of the lower part of the flange, and of at least one movable portion applying itself under the lower part of the flange and mounted so as to be able to move away so as to allow the clamps to open again.

Preferably, the movable part is mounted on levers and pushed by hydraulic jack against the bottom face of the flange of the rail during gripping of the same.

Thus, flash removal can be effected without the necessity of loosening the welding clamps and with added precision.

The invention will now be illustrated by the attached drawings, wherein.

Figure 1:
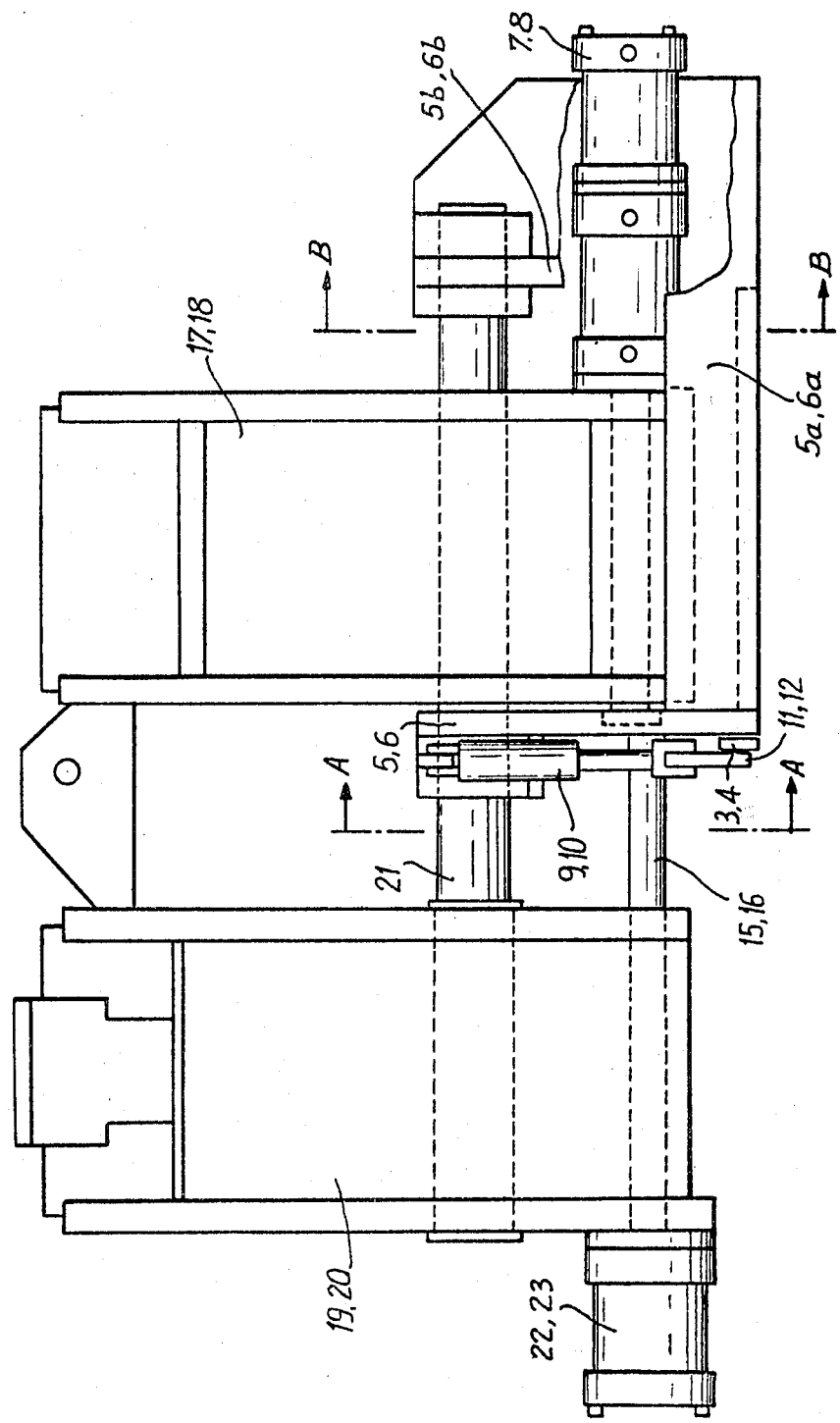
FIG. 1 is a schematic side view of the whole machine.

Referring now to the figures, it is seen that the machine is of the type having two spaced apart gripping clamps 17, 18 and 19, 20 respectively which clamps bear conductive jaws. The said clamps are articulated on a common shaft 21. They slide on shaft 21 and on rods 15 and 16 which are the rods of jacks 22, 23 that effect the relative longitudinal movement of clamps 17, 18 and 19, 20 after application in order to bring together the ends of the rails and weld them together.

A machine of this type is described in greater detail in USSR Patent No. 129 758.

According to the invention, the machine is equipped with flash removing cutters 1, 2, 3, 4 (FIG. 2) mounted on a clamp formed by two clamp halves 5 and 6. The flash removing clamp halves 5 and 6 are independent of gripping clamps 17, 18 and 19, 20 and the clamp halves 5, 6 are articulated on shaft 21 on which the gripping clamps are also pivoted. The clamp halves 5 and 6 slide on rods 15 and 16 as well as on shaft 21.

A jack, or piston-cylinder mechanism 24 is connected between stationary shaft 21 and a member 42 by a pivot link 40 which is pivoted at each end. As the piston of jack 24 retracts and extends, the member 42 is lowered and raised and the clamp 17, 18, 19, 20 move toward and away from the rail sections. The flash removing clamp halves are moved adjacent to the rack by the same operation. However, the flash removing clamp halves can slide on shaft 21 and rods 15, 16 independently of the gripping clamps, under the action of separate jacks 7, 8 acting through rods 25, 26 the impact points of which are seen in dotted lines in FIGS. 2, 3, and 4.

This results in that the gripping and welding clamps 17, 18 and 19, 20 can remain engaged during the flash removing operation, thus eliminating the major drawbacks cited above.

The clamp halves 5 and 6 preferably form part of a chassis 5a, 6a, 5b, 6b which has the configuration of a U-shaped frame surrounding the gripping clamp 17, 18 and sliding by the ends of its arms on shaft 21. Thus, all the stresses resulting from the flash removing operation are practically transmitted to the main shaft 21, without risk of deformation or wearing of rods 15, 16 which mainly serve for guidance and engagement with the work.

The flash removing clamp halves 5, 6 have movable cutter parts 3 and 4, which cover the bottom face of the flanges of rails 27, and cutter parts 1 and 2 rigidly fixed on the flash removing clamp halves 5 and 6. The cutter parts 1 and 2 each correspond to the profile of half the cross section of the rail along its vertical axis of symmetry 28, with the exception of said bottom face of the rail flanges.

Cutter parts 3 and 4 are mounted on clamp halves 5 and 6 by pivot links 11, 12, 13, 14 controlled by jacks 9, 10. As the jacks 9, 10 are operated, the links 11 and 13 cause the cutter parts 3, 4, to be moved in and out.

Figure 2:
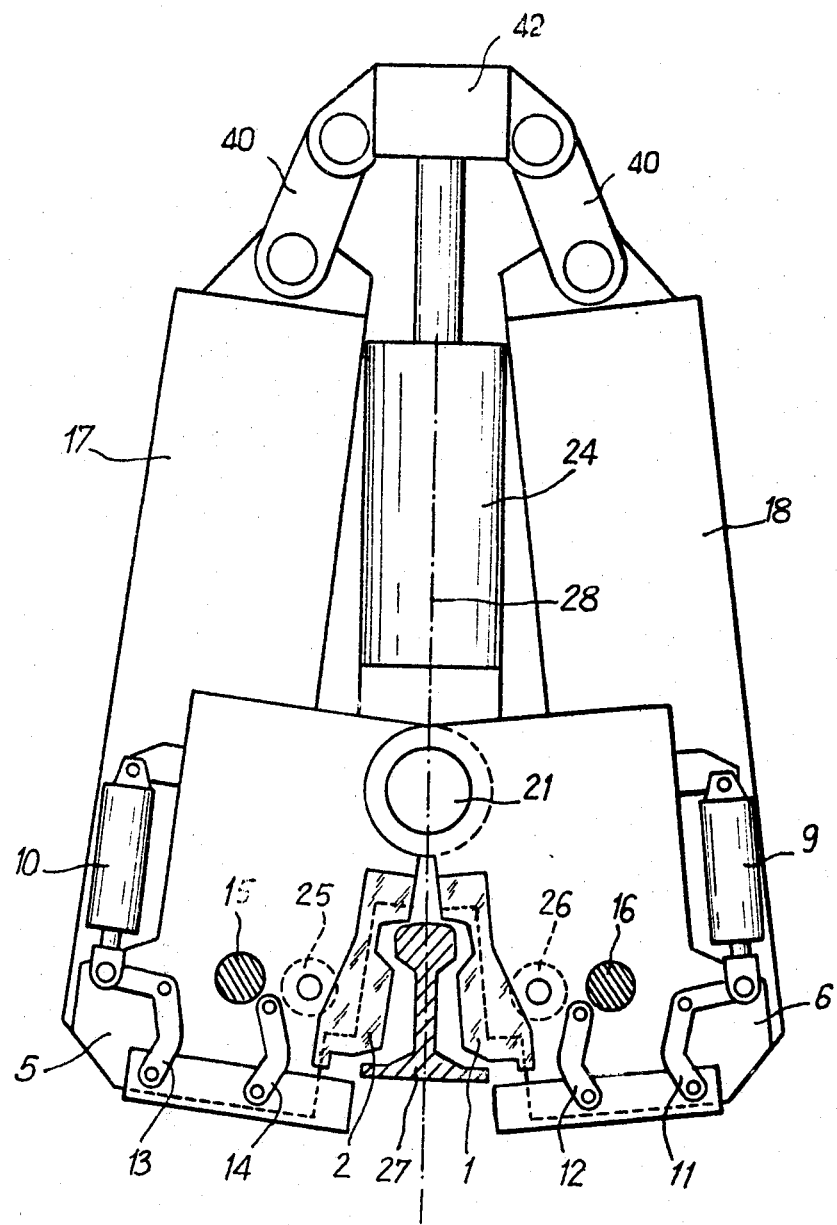
FIG. 2 is a schematic view along A—A of FIG. 1, with the clamps being in opening position.
Figure 3:
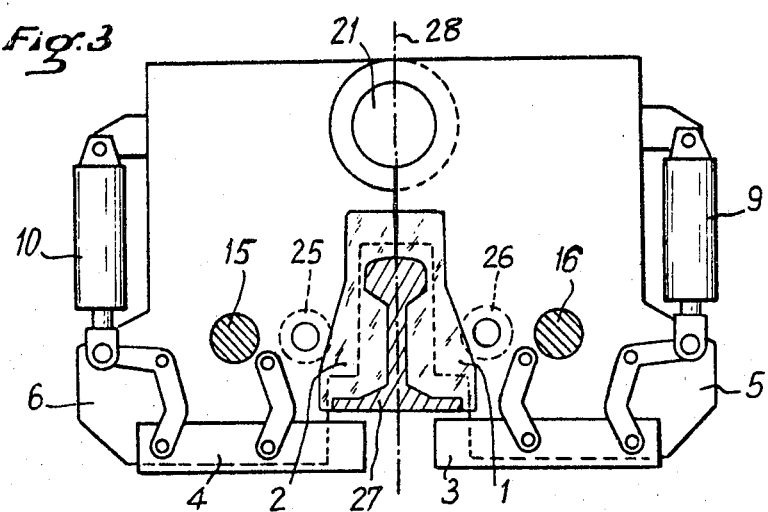
FIG. 3 is a partial view along A—A of FIG. 1, in the course of tightening of the clamps.
Figure 4:
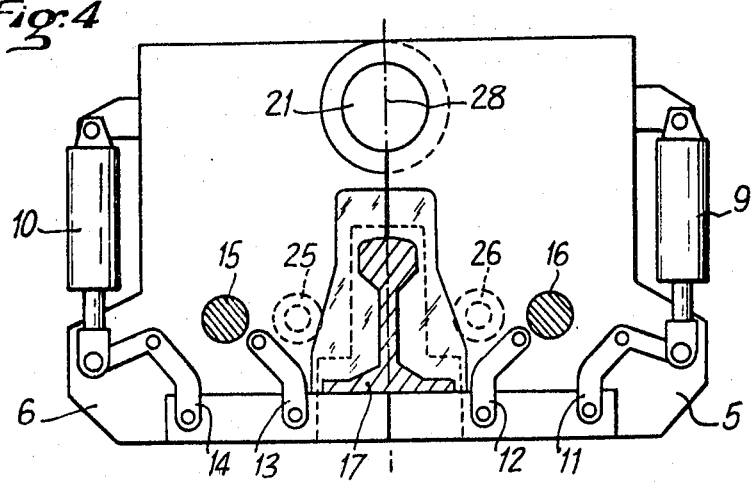
FIG. 4 is a view similar to FIG. 3, the flash removing clamp being engaged into contact.
Figure 5:
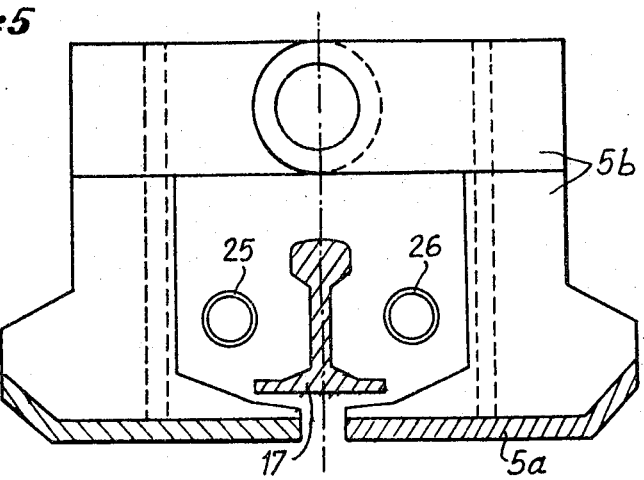
FIG. 5 is a schematic view along B—B of FIG. 1.

FIGS. 2, 3, and 4 illustrate the operation of the device. The gripping claims 17, 18 and 19, 20 each grasp a section of the rail as jack 28 is actuated to move the clamps 17, 18 and 19, 20 toward each other. One or both of said clamps are moved longitudinally of the rail, for example by jacks 22, 23, to press the rail ends together. The welding then takes place.

FIGS. 2, 3 and 4 illustrate the operation of the device. In the opening position of the clamp halves 5 and 6, cutter parts 3 and 4 are moved transversely of the rail by the set of levers under the action of jacks 9, 10 (FIG. 2). When closed, cutters 1 and 2 having been closed as well, the levers bring cutters 3 and 4 close against the flange of the rail. When engaged, cutters 1 and 2 conform to the form of the rail as well as cutters 3 and 4 which are pushed by jacks 9, 10.

At the end of the welding cycle, tools 1 through 4 being applied against the rail, the flash removing jacks 7, 8 are actuated, bringing about the movement of the flash removing clamps 5 and 6 longitudinally of the rail and consequently, the elimination of the welding bead by a cutting or scraping type action. This flash removal is accomplished without relaxation of the tightening pressure of the gripping clamps 17, 18 and 19, 20. Upon completion of the flash removing operation, the lower cutters 3, 4, return to the resting position and the machine can be loosened and disengaged from the rail. If necessary, the rails can be held together by the gripping clamps after flash removal as long as desired in order to assure consolidation of the joint or provide post-heating for the weld if the characteristics of the steel require it.

What is claimed is:

1. A machine for flash welding of rails comprising
    a shaft;
    first and second gripping clamps each having a pair of conductive jaws pivotally mounted on said shaft;
    means for moving at least one said gripping clamp along the shaft relative to the other gripping clamp;
    a flash removing clamp having clamp halves pivotally and slidably mounted on said shaft independently of said gripping clamps;
    and means for moving said flash removing clamp relative to and independently of said gripping clamps.

2. A machine as in claim 1 further comprising cutting means mounted on each half of said flash removing clamp.

3. A machine as in claim 1 further comprising:
    guide rods on which said gripping clamp means and said flash removing clamps are mounted.

4. A machine as in claim 1 wherein a said half of the flash removing clamp means is generally C-shaped and is pivotally connected to said shaft on one arm thereof.

5. A machine as in claim 2 wherein each said half of the flash removing clamp comprises a first portion having a profile corresponding to the profile of half the cross section of a rack along its longitudinal axis, and a second portion adapted to be moved under the lower surface of the rail.

6. A machine as in claim 5 further comprising means for moving said second portion of said half of said flash removing clamp.

7. A machine as in claim 6 wherein said moving means comprises means for moving said second portion transversely of said rail.

* * * * *